Aug. 21, 1956    R. A. COLBY    2,760,138
SHAFT POSITIONING SYSTEM
Filed April 29, 1952    2 Sheets-Sheet 1

INVENTOR.
ROBERT A. COLBY
BY
Morris Moody
ATTORNEY

United States Patent Office 2,760,138
Patented Aug. 21, 1956

2,760,138

SHAFT POSITIONING SYSTEM

Robert A. Colby, Marion, Iowa, assignor to Collins Radio Company, Cedar Rapids, Iowa Application April 29, 1952, Serial No. 284,979

4 Claims. (Cl. 318—467)

This invention relates to a differential shaft positioning mechanism.

Applicant has constructed and used shaft positioning mechanisms according to Patent Number 2,476,673 which issued on July 19, 1949. The number of positions available with such mechanisms is equal to the number of teeth in the stop-wheel. At times it is desirable to obtain a large number of shaft positions. This requires the use of two or more shaft positioning mechanisms with their outputs connected together differentially so as to obtain a larger number of positions. The co-pending patent application of Arthur Wulfsberg and Horst Schweighofer entitled "Shaft Positioning Mechanism for Binary Code Operation," Serial Number 254,514, filed November 2, 1951, now Patent No. 2,676,289, April 20, 1954, discloses such a system wherein a mechanical differential receives the shaft output of a pair of shaft positioning mechanisms and adds them to obtain a larger number of outputs than is available with either. The total number of positions available in such a system is equal to the product of the positions of each mechanism. There are a number of objections to the use of mechanical differentials. One disadvantage is that the cost of an accurate differential is relatively large.

It is an object of this invention, therefore, to provide means for combining the outputs of two or more shaft positioning mechanisms in a manner such that no mechanical differential is required.

Another object of this invention is to provide a shaft control mechanism wherein a first positioning device drives a cam which controls the position of a reference plate upon which a second shaft control device is mounted.

Further objects, features and advantages of this invention will become apparent from the following description and claims when read in view of the drawings, in which:

Figure 1:
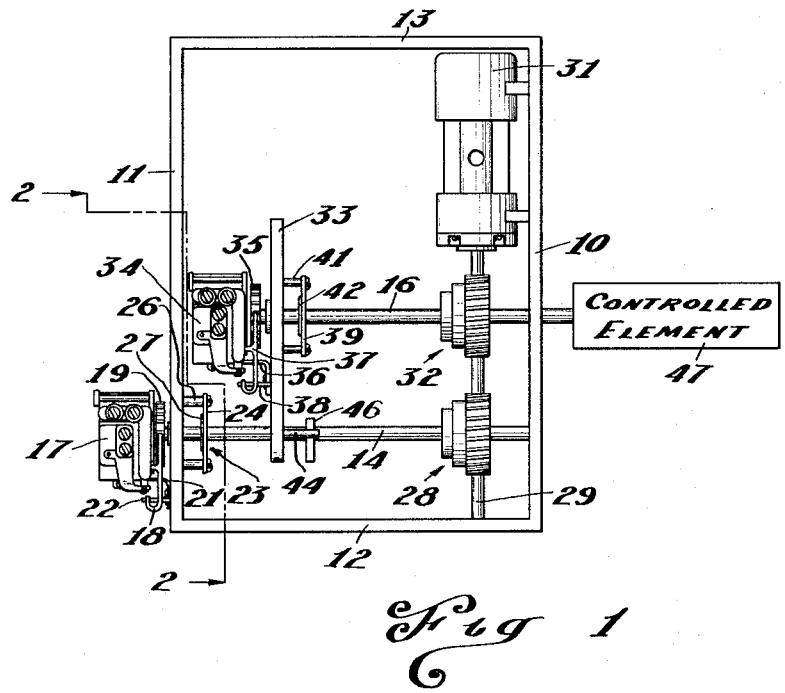
Figure 1 is a top view of the shaft positioning mechanism of this invention.

Figure 1 illustrates a supporting structure comprising end walls 10 and 11, respectively, and connecting walls 12 and 13, respectively. A first shaft 14 is rotatably supported between the end walls 10 and 11 and a second shaft 16 is rotatably supported by the end wall 10.

A first shaft positioning mechanism is attached to the end of the shaft 14 and has its stationary portion mounted to the plate 11. The shaft positioning mechanism may be such as described in Patent Number 2,476,673. The relay 17, the locking pawl 18, and the toothed stop-wheel 19 of the device may be seen.

The relay 17 is mounted by a bracket 21 to the plate 11. The pawl 18 is pivotally supported by a pin 22 on the plate 11. The stop-wheel 19 is attached to the end of the shaft 14 and rotates therewith. A seeking switch 23 has its stator 24 mounted to the plate 11 by standoffs 26 and its rotor 27 connected to the shaft 14.

A clutch 28 is mounted on the shaft 14 and has a driving portion which meshes with a worm 25 on a shaft 29 that is rotatably supported by plate 12 transversely of shaft 14. A driving means 31 is supported by the plate 10 and is connected to the shaft 29 to drive it.

The shaft 16 has a clutch 32 mounted thereon and the clutch 32 has a driving portion which is toothed and meshes with a worm 30 on shaft 29.

A plate 33 is rotatably supported by the shaft 16. A stop-wheel 35 is attached to shaft 16. A relay 34 is supported from the plate 33 by a bracket 36. A pawl 37 is pivotally supported by a pin 38 attached to the plate 33. A second seeking switch 39 has its stator attached by stand-offs 41 to the plate 33 and its rotor 42 attached to the shaft 16. The relay 34, pawl 37, and stop-wheel 35 are part of a shaft positioning mechanism according to Patent Number 2,476,673.

Figure 2:
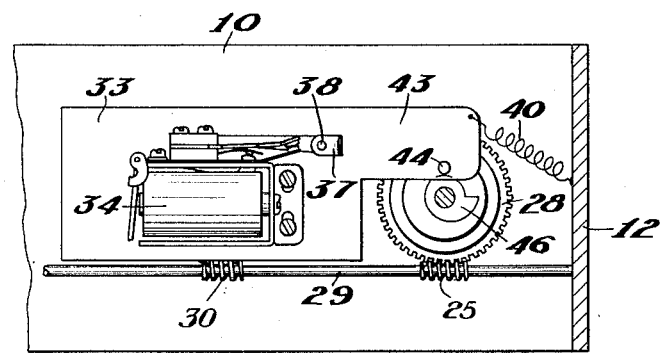
Figure 2 is a sectional view taken on line 2—2 of Figure 1.

The plate 33 has an extending portion 43 which supports a pin 44. A cam 46 is firmly attached to the shaft 14 and engages the pin 44. The shape of the cam is shown in Figure 2. A spring 40 biases the plate 33 toward the cam.

A controlled element is designated as 47 and is connected to shaft 16.

Figure 3:
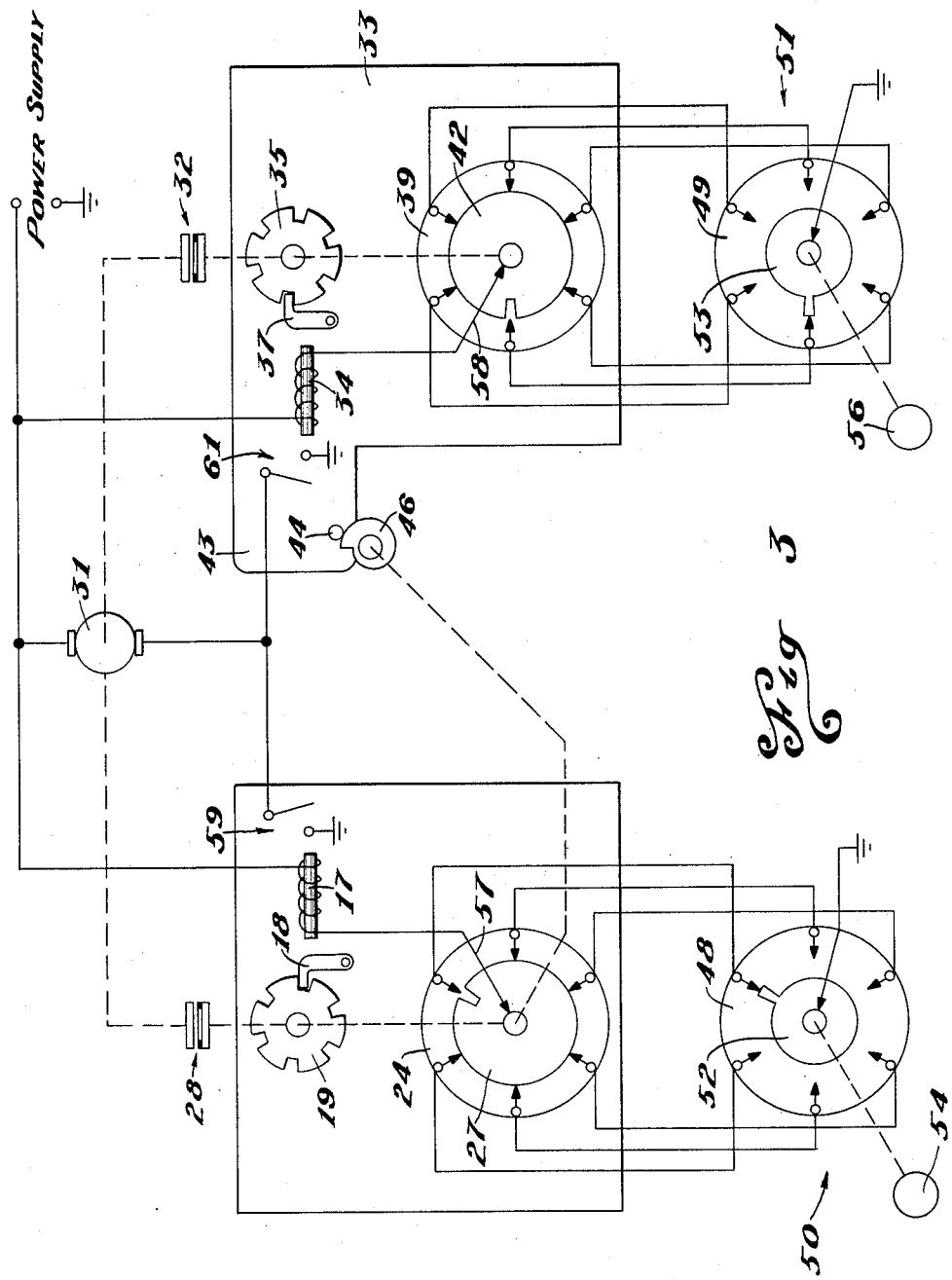
Figure 3 is an electrical circuit that may be used for controlling the shaft positioning device of Figure 1.

The electrical circuit of the apparatus of this invention is shown in Figure 3. The seeking switches have their stators 24 and 39, respectively, connected to stators 48 and 49 of control switches, designated generally as 50 and 51. Rotors 52 and 53, respectively, of the control switches are connected to control knobs 54 and 56.

One side of the relay 17 is always electrically connected to the rotor 27 by a wiper contact 57 and the opposite side is connected to one side of a power supply. Likewise the relay 34 is always connected to the rotor 42 by wiper contact 58 and the other side of the relay is connected to one side of the power supply. The opposite side of the power supply is connected to ground.

The driving means 31, which may be an electric motor, has one side connected to the high side of the power supply and the opposite side connected to a pair of switches 59 and 61. The switches 59 and 61 are controlled, respectively, by the relays 17 and 34 and connect the motor to ground when closed.

In operation, the control switches 54 and 56 are moved to a desired setting. Suppose, for example, the toothed-stop-wheels 19 and 35 have 10 teeth so that there are 10 settings of the shafts 14 and 16. Cam 46 will be cut so that it moves the shaft 16 3.6 degrees per position for a total of 32.4 degrees. Thus, the toothed-stop-wheel 19 will control the fine adjustment of the setting of the controlled element, whereas the toothed-stop-wheel 35 will control the coarse adjustment.

Suppose, for example, that out of the one hundred possible shaft positions a shaft position corresponding to the 68th position were desired. The knob 56, which might be calibrated in ten increments, 0 through 90, would be turned to indicate 60 and the knob 54, which might be calibrated in ten increments, 0 through 9, would be turned to indicate 8. The knobs 54 and 56 control the rotors 52 and 53 which, when moved to new settings, complete an electrical circuit through the seeking switches to the relays 17 and 34. When this occurs the relays 17 and 34 operate switches 59 and 61 thus completing the circuit to the motor 31.

The relays simultaneously remove pawls 18 and 37 from engagement with the stop-wheels 19 and 35 to allow the motor 31 to drive them through the clutches 28 and 32. Since the stop wheels 19 and 35 are mounted on the shafts 14 and 16, respectively, the rotors 27 and 42 will be moved until they correspond to an open circuit position relative to the control switches. When this occurs, the relays 17 and 34 will be de-energized thus allowing the pawls 18 and 37 to engage the stop-wheels 19 and 35.

This opens switches 59 and 61 and turns off motor 31.

It is to be realized, of course, that in case one of the shafts 14 and 16 reaches the correct position prior to the other, that the motor will continue to run until both relays 17 and 34 are de-energized. The clutches 28 and 32 allow this to occur. The clutches slip once the pawls are locked with the stop-wheel.

It is seen that this invention provides a simple and compact differential shaft controlling mechanism which is cheap to build and simple to operate.

Although this invention has been described with respect to a particular embodiment thereof, it is not to be so limited as changes and modifications may be made therein, which are within the full intended scope of the invention, as defined by the appended claims.

I claim:

1. A differential shaft control mechanism comprising, a base member, a pair of shafts rotatably supported by said base member, a first shaft control apparatus connected to one of said shafts and mounted on said base member, a reference plate rotatably supported by the other shaft, a pin mounted on said reference plate, a cam mounted on the first shaft and engageable with said pin, and a second shaft control apparatus mounted on said reference plate and connected to said second shaft to control its position relative to said reference plate.

2. A differential shaft controlling mechanism comprising, a base member, a pair of shafts rotatably supported by said base member, a first shaft positioning apparatus mounted on said base member and connected to the first shaft, a reference plate rotatably supported by the second shaft, a pin mounted on said reference plate, a second shaft positioning apparatus connected to said second shaft and mounted on said reference plate, a cam mounted on said first shaft and engageable with said pin to vary the second shaft angular position of the reference plate, a controlled element connected to said second shaft, and first and second shaft control circuits connected to said first and second shaft positioning apparatuses.

3. A differential shaft controlling mechanism comprising, a base member, a pair of shafts rotatably supported in said base member, a pair of clutches mounted on said first and second shafts, a driving means connected to said first and second clutches, a first toothed stop-wheel connected to said first shaft, a first pawl mounted to said base member and engageable with said first toothed stop-wheel, an electromagnetic relay mounted to said base member and mechanically connected to said pawl to move it out of engagement with said stop-wheel when energized, a seeking switch mounted on said base member, the rotor of said seeking switch mounted to said first shaft, a reference plate rotatably mounted on said second shaft, a cam mounted on said first shaft and engageable with said reference plate, a second toothed stop-wheel mounted on said second shaft, a second pawl pivotally supported on said reference plate and engageable with said second stop-wheel, a second relay mounted on said reference plate and engageable with said second pawl to move it out of engagement with said second stop-wheel when energized, a second seeking switch mounted to said reference plate, the rotor of said second seeking switch connected to said second shaft, a pair of control switches, said pair of control switches connected, respectively, to the first and second seeking switches, a power supply connected to said control switches, and the first and second relays, and said driving means connected to said power supply.

4. A differential shaft positioning mechanism comprising, a base member, a pair of shafts rotatably supported by said base member, a pair of clutches mounted on said first and second shafts, a driving means connected to said first and second clutches, a toothed stop-wheel mounted to said first shaft, a pawl pivotally supported to said base plate and engageable with said stop-wheel, a relay mounted on said base plate and engageable with said pawl, an off-set cam mounted on said first shaft, a reference plate rotatably supported on the second shaft and engageable with said off-set cam, a second stop-wheel connected to said second shaft, a second pawl pivotally supported by said reference plate and engageable with said second stop-wheel, a second relay mounted to said reference plate and connected to said second pawl, a first seeking switch connected to the base plate, a rotor of said first seeking switch connected to said first shaft, a second seeking switch connected to said reference plate, a rotor of said second seeking switch connected to said second shaft, a power supply, a pair of control switches connected respectively to the seeking switches, and said driving means, the first and second relays, and said first and second control and seeking switches connected to said power supply.

References Cited in the file of this patent

UNITED STATES PATENTS

| | | |
|---|---|---|
| 2,467,422 | Bruene | Apr. 19, 1949 |
| 2,578,632 | Miller | Dec. 11, 1951 |
| 2,698,409 | Sherwood | Dec. 28, 1954 |